US008086481B2

(12) United States Patent      (10) Patent No.:   US 8,086,481 B2
Smith      (45) Date of Patent:   Dec. 27, 2011

(54) METHOD FOR PERFORMING A MARKET ANALYSIS

(75) Inventor: Nigel G. Smith, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 998 days.

(21) Appl. No.: 11/998,410

(22) Filed: Nov. 30, 2007

(65) Prior Publication Data

US 2009/0144127 A1    Jun. 4, 2009

(51) Int. Cl.
*G06F 17/00* (2006.01)
(52) U.S. Cl. ............................................. 705/7.32
(58) Field of Classification Search .................. 705/10, 705/7.32
See application file for complete search history.

(56) References Cited

U.S. PATENT DOCUMENTS

| | | |
|---|---|---|
| 5,041,972 A | 8/1991 | Frost |
| 5,124,911 A | 6/1992 | Sack |
| 5,634,021 A | 5/1997 | Rosenberg et al. |
| 5,734,890 A | 3/1998 | Case et al. |
| 5,963,910 A | 10/1999 | Ulwick |
| 6,085,165 A | 7/2000 | Ulwick |
| 6,115,691 A | 9/2000 | Ulwick |
| 6,434,441 B1 | 8/2002 | Beauchamp et al. |
| 6,526,387 B1 | 2/2003 | Ruffin et al. |
| 6,937,913 B2 | 8/2005 | Nishikawa et al. |
| 7,016,882 B2 | 3/2006 | Afeyan et al. |
| 7,340,409 B1 * | 3/2008 | Ulwick ........................... 705/10 |
| 2002/0077882 A1 | 6/2002 | Nishikawa et al. |
| 2002/0184041 A1 | 12/2002 | Muller |
| 2003/0163365 A1 | 8/2003 | Farnes et al. |
| 2005/0240464 A1 | 10/2005 | Borovich et al. |
| 2005/0267796 A1 | 12/2005 | Ficalora et al. |

OTHER PUBLICATIONS

Sauerwein et al., "The Kano Model: How to Delight Your Customers," Department of Management, University of Innsbruck (in: Preprints vol. 1 of the IX. International Working Seminar on Production Economics, Innisbruck/Igls/Austria, Feb. 19-23, 1996, pp. 313-327), pp. 1-14.
Berger et al., "Kano's Methods for Understanding Customer-defined Quality," Center for Quality of Management Journal vol. 2, No. 4, Fall 1993, pp. 3-7.
"Kano Model Analysis," pp. 1-3 (source, date unknown).

* cited by examiner

*Primary Examiner* — Thomas Dixon
(74) *Attorney, Agent, or Firm* — Finnegan, Henderson, Farabow, Garrett & Dunner LLP

(57) ABSTRACT

A method for performing a market analysis may include collecting survey data, which may include evaluation data for desired outcomes, the desired outcomes consisting of attributes of one or more products or services. The desired outcome evaluation data may include importance and satisfaction data. Further, the survey data may include evaluation data for potential features. The potential features evaluation data may include desirability data indicative of the affinity survey participants have for potential features. The method may further include processing the collected survey data using a computer processor. The processing may include calculating, based on the importance and satisfaction data, opportunity scores for the individual desired outcomes. The processing may also include correlating potential features with desired outcomes. In addition, the processing may include ranking the potential features based on the collected desirability data and the calculated opportunity score.

19 Claims, 10 Drawing Sheets

IMPORTANCE SCORES (MULTIPLICATION)

| OUTCOME | % TB (8,9,10) | MEAN RATING | TOP BOX SCORE= TB/10 | COMPOSITE SCORE= (TBSx MEAN RATING) /10 |
|---|---|---|---|---|
| A | 100 | 10 | 10 | 10.0 |
| B | 100 | 9 | 10 | 9.0 |
| C | 100 | 8 | 10 | 8.0 |
| D | 80 | 9 | 8 | 7.2 |
| E | 80 | 8 | 8 | 6.4 |
| F | 80 | 7 | 8 | 5.6 |
| G | 50 | 7 | 5 | 3.5 |
| H | 50 | 6 | 5 | 3.0 |
| I | 50 | 5 | 5 | 2.5 |
| J | 50 | 4.5 | 5 | 2.3 |
| K | 20 | 7 | 2 | 1.4 |
| L | 20 | 6 | 2 | 1.2 |
| M | 20 | 5 | 2 | 1.0 |

IMPORTANCE SCORES (ADDITION)

| OUTCOME | % TB (8,9,10) [44] | MEAN RATING [46] | TOP BOX SCORE= TB/10 [48] | COMPOSITE SCORE= (TBS + MEAN RATING) /2 [60] |
|---|---|---|---|---|
| A | 100 | 10 | 10 | 10.0 |
| B | 100 | 9 | 10 | 9.5 |
| C | 100 | 8 | 10 | 9.0 |
| D | 80 | 9 | 8 | 8.5 |
| E | 80 | 8 | 8 | 8.0 |
| F | 80 | 7 | 8 | 7.5 |
| G | 50 | 7 | 5 | 6.0 |
| H | 50 | 6 | 5 | 5.5 |
| I | 50 | 5 | 5 | 5.0 |
| J | 50 | 4.5 | 5 | 4.8 |
| K | 20 | 7 | 2 | 4.5 |
| L | 20 | 6 | 2 | 4.0 |
| M | 20 | 5 | 2 | 3.5 |

CLASSIFYING RESPONSES

| | NEGATIVE QUESTION ("HOW WOULD YOU FEEL IF THE PRODUCT DID NOT HAVE THIS FEATURE?") | | | |
|---|---|---|---|---|
| | LIKE | NORMAL | NEUTRAL | DISLIKE |
| POSITIVE QUESTION ("HOW WOULD YOU FEEL IF THE PRODUCT DID HAVE THIS FEATURE?") — LIKE | Q | A | A | O |
| NORMAL | R | I | I | M |
| NEUTRAL | R | I | I | M |
| DISLIKE | R | R | R | Q |

A = ATTRACTIVE
M = MUST BE
R = REVERSE
O = ONE-DIMENSIONAL
Q = QUESTIONABLE
I = INDIFFERENT

*FIG. 9*

TABLE OF RESULTS

| POTENTIAL FEATURE | A | O | M | I | R | Q | TOTAL |
|---|---|---|---|---|---|---|---|
| FEATURE 1 | 20 | 54 | 10 | 10 | 4 | 2 | 100 |
| FEATURE 2 | | | | | | | |
| FEATURE 3 | | | | | | | |
| FEATURE 4 | | | | | | | |

A = ATTRACTIVE
M = MUST BE
R = REVERSE
O = ONE-DIMENSIONAL
Q = QUESTIONABLE
I = INDIFFERENT

*FIG. 10*

| DESIRED OUTCOMES (IN ORDER OF DECREASING OPPORTUNITY SCORE) | RANK | CORRELATION | RANK | POTENTIAL FEATURES (IN ORDER OF DECREASING DESIRABILITY COEFFICIENT) |
|---|---|---|---|---|
| POWER OUTPUT | 1 | | 1 | HYBRID POWER SOURCE |
| FUEL EFFICIENCY | 2 | | 2 | POWER SEAT |
| SERVICEABILITY | 3 | | 3 | AUTO CLIMATE CONTROL |
| DRIVER COMFORT | 4 | | 4 | DIESEL ENGINE |
| LOW EMISSIONS | 5 | | 5 | MODULAR ASSEMBLY |
| | 6 | | 6 | |
| | 7 | | 7 | |
| | 8 | | 8 | |
| | 9 | | 9 | |

84 (Desired Outcomes), 86 (Potential Features)

FIG. 12

METHOD FOR PERFORMING A MARKET ANALYSIS

TECHNICAL FIELD

The present disclosure is directed to a method for conducting a market analysis and, more particularly, to a method including evaluation of customers' desires as well as their needs in order to determine which potential features should be included on a new product or a redesign of an existing product.

BACKGROUND

Several types of information may provide insight into what features should be included on a new product in order for the product to have the best market success. Such information may include input from customers about the desirability of various outcomes (e.g., good fuel economy), the current level of satisfaction with regard to achieving those desired outcomes, and the desirability of various potential features or solutions that may achieve the desired outcomes (e.g., a hybrid drive may be a feature that provides better fuel economy).

Some existing systems and/or business models may consider only some of these types of information in determining which features to include on a product. For example, systems and/or methods have been developed that are tailored to determining how much customers like the idea of certain features (e.g., a hybrid drive or a diesel engine), but these systems and/or methods do not determine how important the benefits (e.g., better fuel economy) of such features are to the customers. Therefore, these systems and/or methods fail to consider how much opportunity there is in the marketplace for such features (i.e., how satisfied the customer currently is with the presently available solution(s) for providing good fuel economy).

Other business models may analyze customer input regarding desired outcomes and determine opportunity merely for the purpose of identifying which outcomes designers should try to find solutions for. These models, however, do not consider the desirability of any particular potential solutions. Since these prior art methods are merely tailored to figuring out how important certain outcomes are to customers, these methods leave manufacturers to guess which solution will achieve the best market success. U.S. Patent Application Publication No. 2003/0163365, issued to Fames et al. (hereinafter "the '365 publication") discloses one such system/method. The '365 publication appears to disclose using two different types of analysis based on customer feedback. However, both types of analysis are performed on customer feedback having to do with the outcomes customers want. In the '365 publication, the choice about which features will be used to achieve the desired outcomes is not based on customer feedback regarding any potential features.

The present disclosure is directed at improvements in existing market analysis methods.

SUMMARY

In one aspect, the present disclosure is directed to a method for performing a market analysis. The method may include collecting survey data from survey participants. The survey data may include evaluation data for desired outcomes, the desired outcomes consisting of attributes of one or more products or services. The desired outcome evaluation data may include importance data indicative of the level of importance survey participants respectively attribute to the individual desired outcomes. The desired outcome evaluation date may also include satisfaction data indicative of the present level of satisfaction survey participants have with the ability of current products or services to achieve the individual desired outcomes. The survey data may also include evaluation data for potential features that could be implemented to provide the desired outcomes. The potential features evaluation data may include desirability data indicative of the affinity survey participants have for the individual potential features. The method may further include processing the collected survey data using a computer processor. The processing may include calculating, based on the importance data and the satisfaction data, opportunity scores for the individual desired outcomes, wherein the opportunity scores are indicative of the extent to which the desired outcomes are valued by the survey participants and presently unmet by current products or services. The processing may also include correlating potential features with desired outcomes that the potential features could provide. In addition, the processing may further include ranking the potential features based on the collected desirability data for the individual potential features and the calculated opportunity score for the individual desired outcomes.

In another aspect, the present disclosure is directed to a system for performing a market analysis. The system may include a processor configured to collect survey data from survey participants. The survey data may include evaluation data for desired outcomes. The desired outcomes may consist of attributes of one or more products or services. The desired outcome evaluation data may include importance data indicative of the level of importance survey participants respectively attribute to the individual desired outcomes. The desired outcome evaluation data may also include satisfaction data indicative of the present level of satisfaction survey participants have with the ability of current products or services to achieve the individual desired outcomes. In addition, the survey data may include evaluation data for potential features that could be implemented to provide the desired outcomes. The potential features evaluation data may include desirability data indicative of the affinity of survey participants for the individual potential features. The processor may also be configured to process the collected survey data by calculating, based on the importance data and the satisfaction data, opportunity scores for the individual desired outcomes, wherein the opportunity scores are indicative of the extent to which the desired outcomes are valued by the survey participants and presently unmet by current products or services. The processor may be further configured to rank the potential features based on the collected desirability data for the individual potential features and the calculated opportunity score for the individual desired outcomes.

BRIEF DESCRIPTION OF THE DRAWINGS

FIG. 9 is a chart illustrating one exemplary scheme for classifying desirability data.

FIG. 10 is a table illustrating hypothetical classified desirability data for a hypothetical potential feature.

FIG. 12 is a graphic illustrating correlation between various desired outcomes and potential product features that may produce those outcomes.

DETAILED DESCRIPTION

Reference will now be made in detail to the drawings. Wherever possible, the same reference numbers will be used throughout the drawings to refer to the same or like items.

The presently disclosed method may involve considering outcomes indicated by customers to be desirable and correlating those desired outcomes with potential features that are already at some stage of development. In other words, using the disclosed method, a manufacturer may obtain information about, not only what customers want, but also how they feel about potential solutions that may give them what they want. This makes product development less of a "trial and error" endeavor with regard to deciding which features to incorporate into the product.

For example, when redesigning a vehicle that is presently powered by a gasoline engine, a manufacturer may be considering two or more possible solutions to improve fuel efficiency for that vehicle. One possible solution might be switching to a hybrid gas/electric power source and the another possible solution may be switching to a diesel engine. Manufacturers may utilize the presently disclosed system and method to determine not only the opportunity to fill a void in the marketplace with respect to providing better fuel economy, but also to determine which of the two possible solutions will have the most positive effect on sales of the vehicle.

Figure 1:
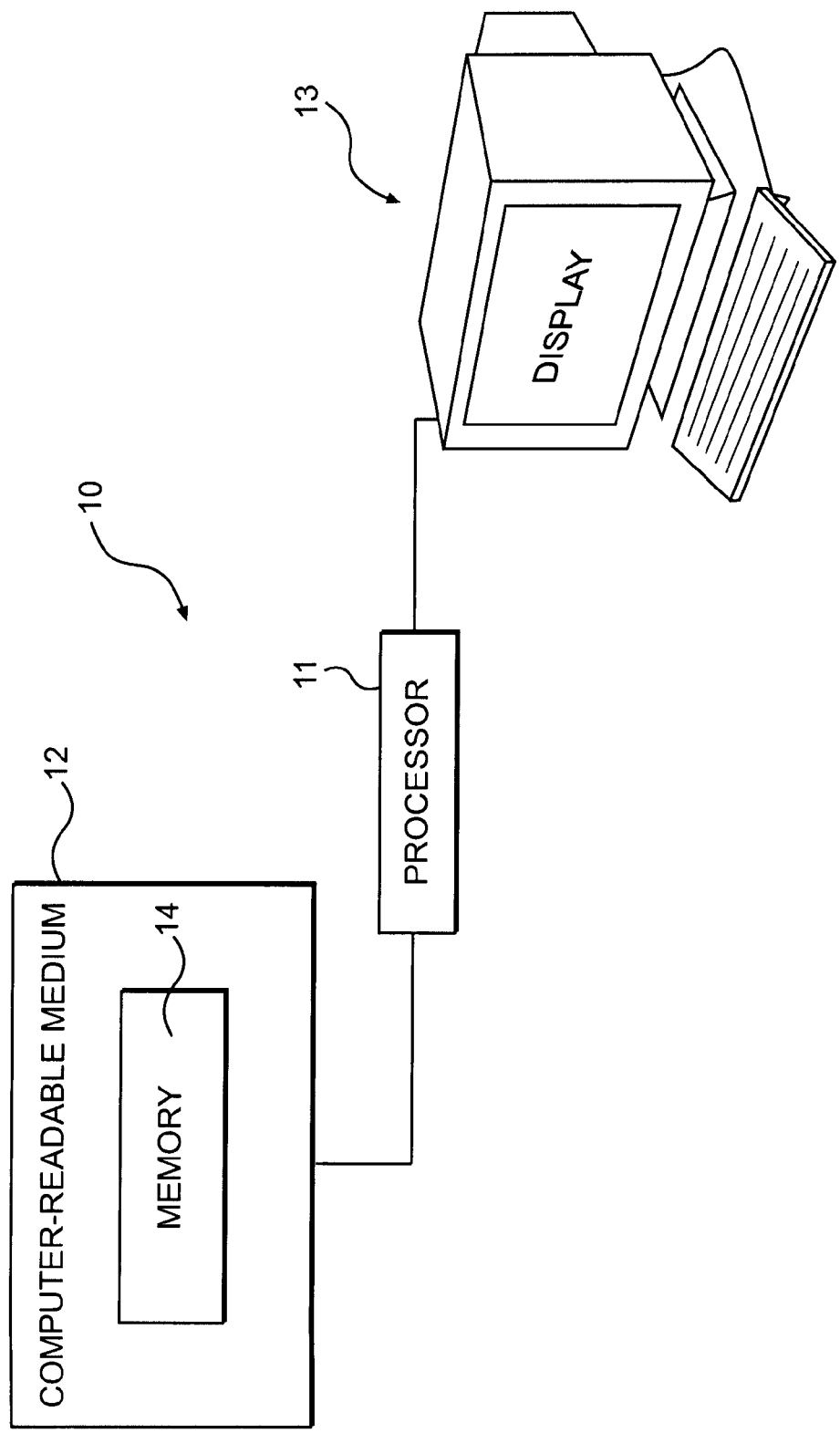
FIG. 1 is a diagrammatic illustration of a system for performing a market analysis according to an exemplary disclosed embodiment.

FIG. 1 illustrates a system 10 for performing a market analysis. System 10 may include a processor 11, a computer-readable medium 12 operatively coupled to processor 11, and a display 13.

Computer-readable medium 12 may include a memory 14 which may store collections of data associated with the disclosed method. Computer-readable medium 12 may also have stored thereon instructions for performing the disclosed method. Computer-readable medium 12 may include any type of computer-readable medium including, for example computer chips and secondary storage devices, including hard disks, floppy disks, optical media, CD-ROM, or other forms of RAM or ROM.

Display 13 may include any type of display device or equipment. For example, display 13 may be configured to provide visual feedback regarding system 10 and its components and functions. Display 13 may be any kind of display, including, for instance, a screen display, as shown in FIG. 1. For example, display 13 may include a cathode ray tube (CRT), liquid crystal display (LCD), plasma screen, or the like. In addition to providing visual feedback regarding functions of system 10 and results of the disclosed market analysis method, display 13 may also be configured to accept input. In such an embodiment, display 13 may include, for example, a touch screen. Display 13 may also provide other information regarding any other device and/or system associated with system 10. System 10 may be Internet-based and, as such, may be displayed by display 13 as one or more web pages available on a local or global network.

Processor 11 may be configured to collect survey data from survey participants. The survey data may include evaluation data for desired outcomes, as well as evaluation data for potential features that could be implemented to provide the desired outcomes. Processor 11 may also be configured to process the collected survey data by, for example, calculating opportunity scores for the individual desired outcomes, and ranking the potential features. Processor 11 may be configured to calculate a satisfaction coefficient indicative of the inclusion data for the individual potential feature. Processor 11 may also be configured to calculate a dissatisfaction coefficient indicative of the exclusion data for the individual potential feature. In addition, processor 11 may be further configured to calculate a desirability coefficient based on the satisfaction coefficient and dissatisfaction coefficient for each respective potential feature. Exemplary methods for performing a market analysis for which system 10 may be used are discussed in greater detail below.

Phase 1

Figure 2:
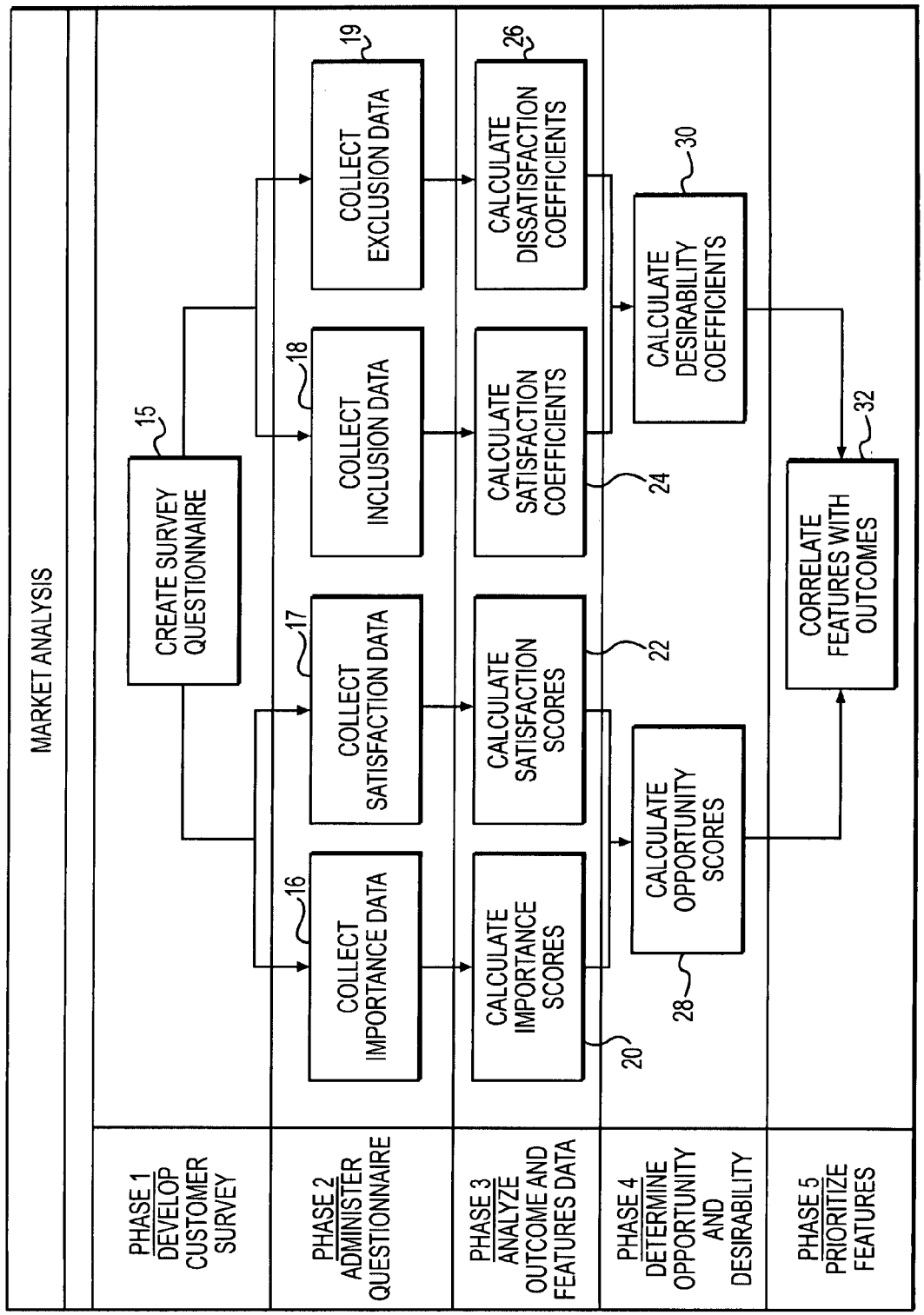
FIG. 2 is a flow chart illustrating an exemplary method for performing a market analysis.

FIG. 2 is a flowchart illustrating various aspects of the presently disclosed method for performing a market analysis regarding a new product in development or a potential product to be developed. For purposes of illustration, the method has been broken down into five phases (listed in the left hand column of FIG. 2). The delineation between phases, however, is for purposes of discussion only, and the various aspects of the disclosed method may be executed in any suitable order. Therefore, there may be overlap and/or reordering of the various phases and/or the sub-parts thereof.

In phase 1, when a request is made for a market analysis relating to a given project, an initial workshop or meeting may be held to develop a customer survey. At this initial workshop, participants working on the project may brainstorm about what kinds of capabilities or qualities ("outcomes") consumers will want the new product to have. The workshop participants may also brainstorm about potential solutions (referred to herein as potential features) that could be incorporated into the product. At the workshop, participants may generate a list of what they believe to be desired outcomes, as well as a list of potential features.

A desired outcome may be a general desired attribute, and a related potential feature may be a feature that could achieve the desired outcome. For example, a desired outcome might be higher fuel efficiency, and a potential solution or potential feature might be an electric motor or hybrid power source, as alluded to above.

In some cases, market research may be used to initially generate the lists of desired outcomes and/or potential features. Alternatively or additionally, lists of desired outcomes or potential features may be generated based on the intuition and collective experience of the workshop participants.

As part of phase 1, the workshop participants may create a survey questionnaire seeking feedback from customers and/or potential customers about each of the listed outcomes and features. (Step 15.) The questionnaire may be a two-part questionnaire, wherein one part may be tailored to collect customer reactions to various outcomes and a second part may seek customer reactions to various potential features.

Phase 2

In phase 2, the questionnaire may be administered to customers and/or potential customers. Focus groups, web-based distribution, and/or other mechanisms may be used to administer the questionnaire. Thus, phase 2 may be a data collection phase, wherein the questionnaire may be used to collect data from a market sample. For each desired outcome, importance data may be collected (step 16) by asking customers (via the questionnaire) to rate (e.g., using a scale of 1-5) the importance of achieving the desired outcome. Satisfaction data may also be collected (step 17) by asking customers to rate their present level of satisfaction with their current ability to achieve the desired outcome. For example, if the desired outcome is fuel efficiency, the first question might be, "How important is it for the product at issue to be fuel efficient?" The corresponding second question might be, "What is your current level of satisfaction with the fuel efficiency that the currently available versions of this product already achieve?"

The purpose of this dual question methodology is to generate an "opportunity score" for each desired outcome. For example, when customers tend to rate the level of importance of a desired outcome as low and/or tend to rate their current level of satisfaction with a desired outcome as high, there is little business opportunity with respect to that desired outcome. That is, if a particular outcome is not important to customers, providing a product with the capability of achieving that outcome does not make the product much more attractive to customers than if the product did not have that capability. Also, if customers indicate a high level of satisfaction with the ability of current products to achieve the outcome (e.g., they are happy with the level of fuel efficiency of their current product), then there is little opportunity to improve the product with regard to this outcome, because customers would not be much more satisfied with (and thus no more inclined to purchase) a new product with higher fuel efficiency, even if the new product were to have even better fuel efficiency than the currently available versions.

On the other hand, when customers tend to highly rate the importance of achieving a particular desired outcome, and rate their current level of satisfaction with regard to that outcome as low (i.e., customers' desires for a particular outcome are strong, but those desires are not being met by the existing products on the market or in use), development of features/solutions that achieve the desired outcome for a new product will likely translate into higher customer satisfaction with the new product. Therefore, a product with an improved capability of achieving the desired outcome will likely be well received and, consequently, sell well.

The second part of the questionnaire focuses on potential "solutions" for achieving the desired outcomes identified in the first part of the survey. That is, the second part of the questionnaire solicits information about how customers feel about potential features of a given product. For each potential feature identified in the survey, the customer may be asked to answer both a positive question to collect inclusion data (step 18) and a negative question to collect exclusion data (step 19). The positive question may ask the user to rank how the user would feel if the feature were to be included in the product at issue. The negative question may ask the user to rank how the user would feel if the feature were to be excluded from the product at issue.

Brief Description of Phases 3-5

During phase 3, market analysis software may be employed to compile, manipulate, and analyze the outcome and features data collected via the survey. It should be noted that, although the disclosed method is discussed in terms of using market analysis software, the data could be processed by hand, particularly if the number of survey participants is small.

To process the survey data, equations may be written (e.g., using a spreadsheet program) that are unique to the particular analysis. Equations may developed to calculate/derive various outcome-related "scores" from the collected data. For example, equations may be developed to determine an importance score indicative of how important each outcome is to customers (e.g., using the data collected at step 16). At step 20, the importance score may be calculated for each desired outcome. The equations may also determine a satisfaction score indicative of the extent to which customers feel that current products are satisfying their needs with respect to each outcome (e.g., using the data collected at step 17). At step 22, the satisfaction score may be calculated for each desired outcome.

In addition to utilizing equations to analyze data regarding desired outcomes, the presently disclosed method may utilize equations written to analyze the data collected with respect to various potential features. In this regard, the method may involve calculating a satisfaction coefficient (step 24) and a dissatisfaction coefficient (step 26) for each of the various features identified on the second portion of the survey. The satisfaction coefficient quantifies how satisfied customers would be if a particular feature were included in the product at issue, and the dissatisfaction coefficient quantifies how dissatisfied customers would be if the feature were excluded from the product.

In phase 4, the method may include calculating opportunity scores (step 28) based on the scores and coefficients calculated in phase 3. That is, the method may include evaluating opportunities to satisfy customers' unmet desires for outcomes. Phase 4 may also involve calculating desirability coefficients (step 30) (i.e., determining which potential features are most desirable to customers).

In step 28, one or more equations may be used for each desired outcome to calculate an opportunity score identifying the extent of any gap between customers' desires and customers' current level of satisfaction. In other words, the opportunity score may be a function of both the importance score and the satisfaction score.

In phase 5, the various features and outcomes may be correlated with one another and interpreted with regard to which potential features are indicated as likely to have the most business success (step 32). Phases 3, 4, and 5 are discussed in greater detail below with respect to FIGS. 3-12.

Phase 3

In phase 3, the collected survey data may be input into an off-the-shelf, commercially available software program, such as a spreadsheet program. A standard software shell may be utilized for each new market research project. Alternatively, unique code may be written for each unique survey. The code may be written within the spreadsheet program to perform the calculations needed to generate three values for each desired outcome. The spreadsheet program may include, or may be somewhat analogous to, Microsoft's Excel spreadsheet program, in as much as a user may manually create a spreadsheet, enter data, and write equations to perform calculations on data in rows and columns.

Figure 3:
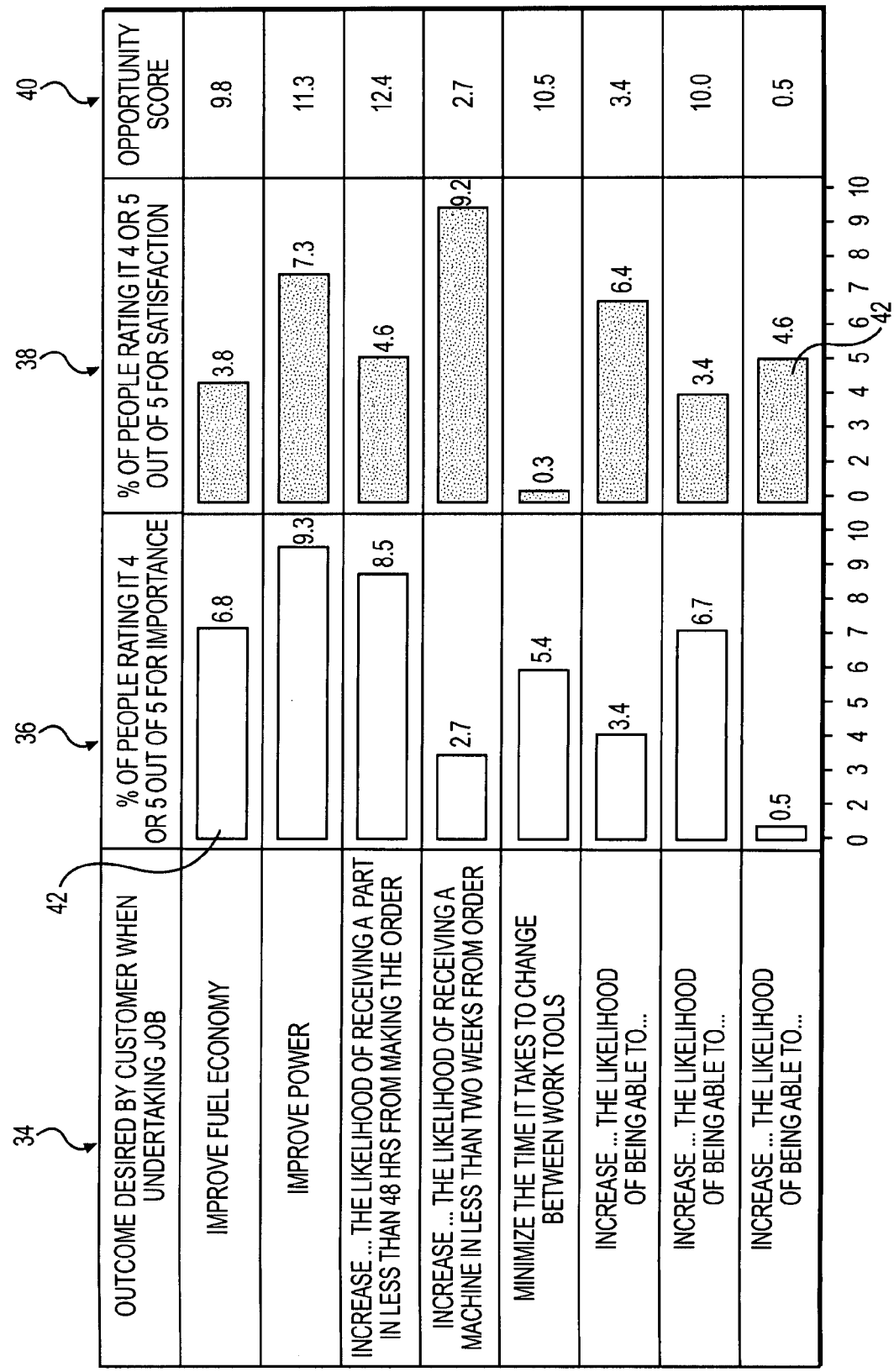
FIG. 3 is a chart depicting exemplary results from a hypothetical customer survey regarding several hypothetical desired outcomes.

FIG. 3 is a chart containing exemplary survey results for several exemplary desired outcomes. Outcomes may be listed in an outcome column 34. For each outcome, an evaluation of market importance may be listed in a market importance column 36, an evaluation of market satisfaction may be listed in a market satisfaction column 38, and an opportunity score may be listed in an opportunity score column 40.

As shown in FIG. 3, market importance column 36 may indicate numerically and/or graphically (e.g., by bar graphs 42, as shown) a percentage of survey participants that rated the desired outcome with an importance of at least a predetermined minimum rating. For example, as shown in FIG. 3, market importance column 36 may indicate the percentage of people rating the outcome a 4 or 5 out of 5 for importance. Market satisfaction column 38 may indicate the percentage of people rating the outcome a 4 or 5 out of 5 for satisfaction. These percentages, or derivations therefrom, may be referred to as "top box scores," because they represent the number of survey participants that checked the "top boxes" (i.e., 4 or 5 out of 5) on the survey. In some embodiments, these percentages may be considered the importance score and the satisfaction score, respectively. In other embodiments, the importance score and satisfaction score may be determined/calculated differently. For example, in some embodiments the importance score of a given desired outcome may be the average or mean rating the outcome received in the survey.

Figures 4, 5:
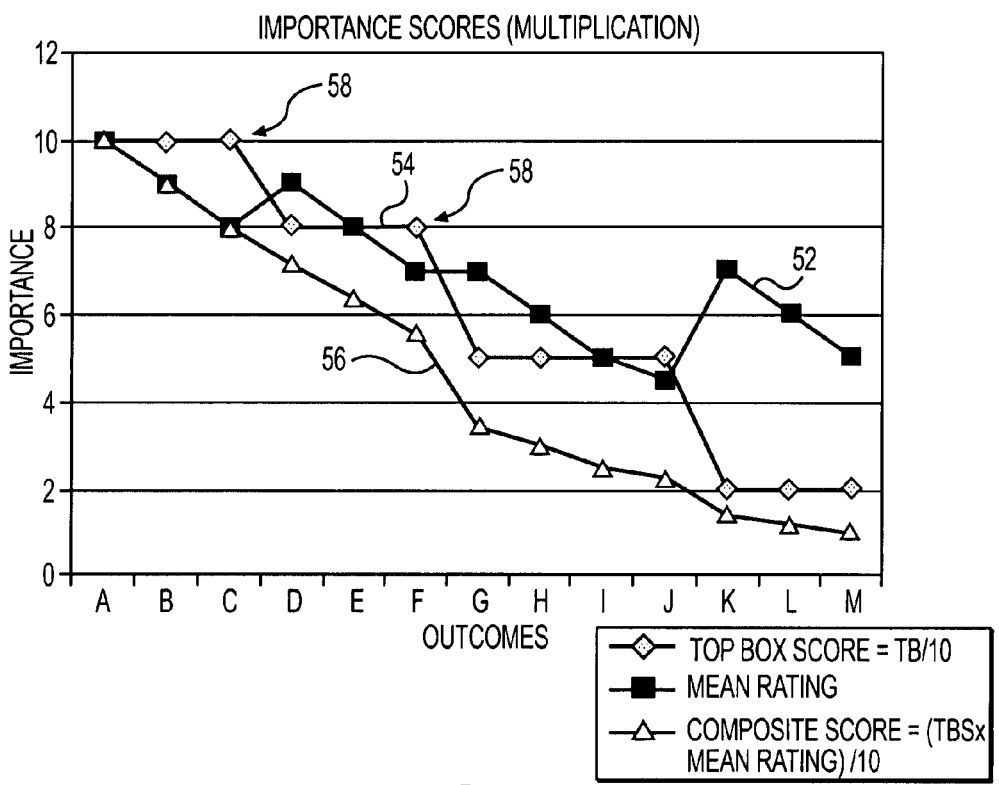
FIG. 4 is a table including more detailed results from another hypothetical survey regarding several hypothetical desired outcomes and further illustrating calculation of importance scores.
FIG. 5 is a line graph of the data in the table shown in FIG. 4.

In some embodiments, the disclosed method may calculate the importance scores and/or the satisfaction scores based on both the mean ratings and the top box scores for the individual outcomes. FIG. 4 is a table of hypothetical importance score data for 13 different hypothetical, desired outcomes (labeled A-M). The table includes top box raw percentage data (column 44), (i.e., the percentage of survey participants that rated importance of the respective outcomes as an 8, 9, or 10 out of 10). In column 46 are the mean ratings, which may be obtained by averaging the ratings of all 10 survey participants. The top box scores in column 48 have been calculated by dividing the raw top box percentage data by 10 to put the top box score on the same scale as the mean rating (i.e, a scale of 1-10), for purposes of comparison. In column 50 are composite scores, which may be calculated by multiplying the top box scores by the mean ratings for each outcome. Again, for purposes of comparison, the product of the top box score and the mean rating was divided by 10 in order to derive a composite importance score that is on the same scale (1-10) as the top box score and the mean rating.

FIG. 5 is a graph of the data in FIG. 4. Line 52 represents the mean rating for each of the 13 desired outcomes. Line 54 represents the top box score for each of the 13 desired outcomes. Line 56 represents the composite importance score for each of the 13 desired outcomes. Mean rating and top box score can each be used alone as the importance score. In some embodiments, however, it may be beneficial to calculate a composite score that takes both mean rating and top box score into consideration. For example, it is noteworthy that line 54 showing the top box scores has several steps 58, wherein each step 58 includes several top box scores that are the same.

While top box scores alone may provide a general idea of how survey participants felt about the desired outcomes, there may be differences in the importance data that are not reflected by line 54. For example, although each of outcomes D, E, and F have the same top box score (i.e., 8), each of outcomes D, E, and F have different mean ratings. Therefore, in some cases (especially when analyzing small sample sets), using mean ratings may provide more differentiation between importance scores than using top box scores. Mean ratings, however, may not always be the most accurate representation of importance relative to the other desired outcomes in the survey. For example, as shown with outcomes C and D, outcome C has a higher top box score than outcome D, but outcome C has a lower mean rating than outcome D. Therefore, if one were to prioritize these two outcomes with respect to which is more important to the survey participants, the priority determination comes out differently depending on whether mean rating or top box score is considered.

This data indicates generally that both of these outcomes were rated with relatively high importance by the survey participants. In some cases this general importance relative to other surveyed outcomes may be enough information for a manufacturer to make business decisions. In other cases, though, it may be desirable to prioritize outcomes like C and D where the importance ranking based on the mean rating differs from the importance ranking based on the top box score. Therefore, in these cases, importance may be ranked based on a composite score, which takes into account both mean rating and top box score. As can be seen from line 56, the composite score provides both the accuracy of the top box score and the differentiation of the mean rating.

In FIGS. 4 and 5, the composite score was calculated by multiplying the top box score by the mean rating and dividing by 10.

Composite Importance Score=((Mean Rating)*(Top Box Score))/10

Dividing by a correction factor of 10 puts the composite score on the same scale (i.e., 1-10) as the mean rating and the top box score in this example. However, use of this scale is only for purposes of comparing the three ways to calculate importance score. Any suitable scale may be used and the resulting composite score scale need not match that of the mean rating and top box score. For example, if the mean rating has a scale of 1-10 and the top box score has a scale of 1-10, the composite score may be calculated simply by multiplying the mean rating by the top box score, without dividing by a correction factor. In this case, the composite importance score would simply have a scale of 1-100.

Figures 6, 7:
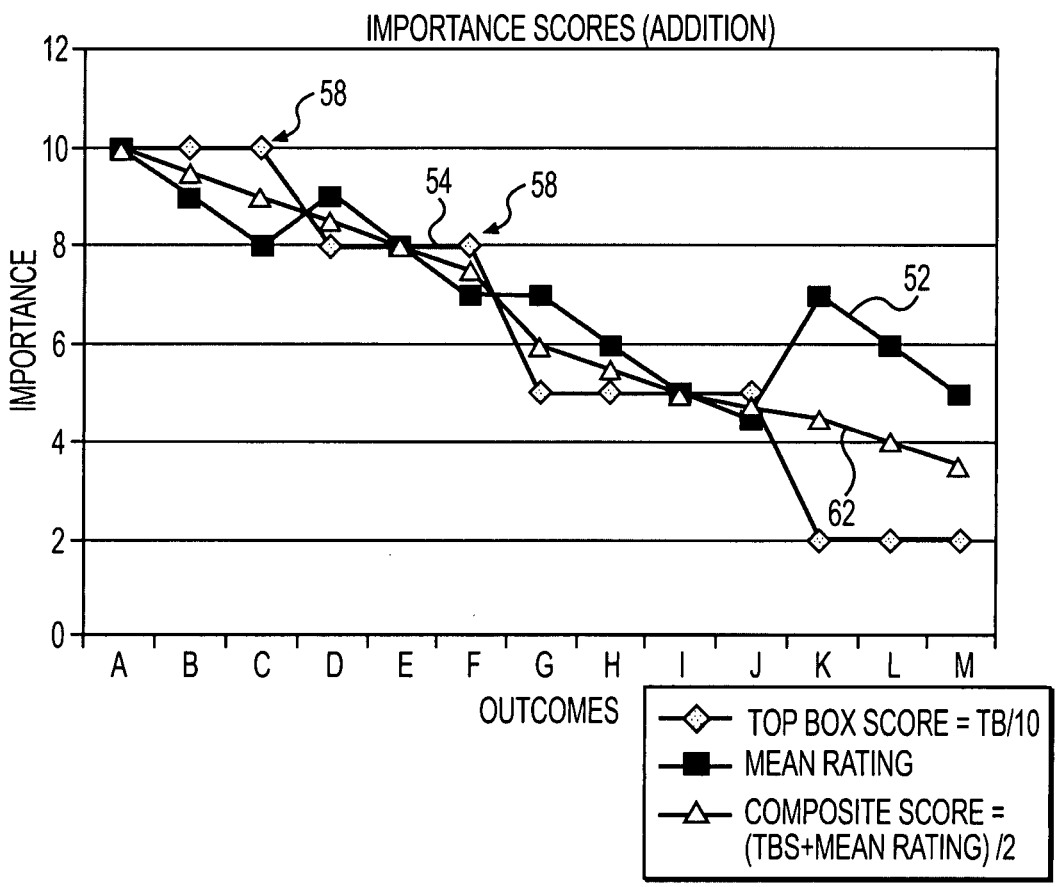
FIG. 6 is another set of hypothetical survey data with a composite importance score calculated in a different way from that in FIGS. 4 and 5.
FIG. 7 is a line graph of the data in the table shown in FIG. 6.

FIGS. 6 and 7 illustrate a slightly different way to calculate the composite importance score using the same raw data as in FIGS. 4 and 5. Whereas, in FIGS. 4 and 5 the composite score was calculated by multiplying mean rating by top box score, in FIGS. 6 and 7 the composite score (listed in a column 60) was calculated by adding mean rating and top box score. In the example shown in FIGS. 6 and 7, for purposes of comparison only, the sum of the mean rating and the top box score was also divided by 2, in order to match the scale of the composite score to that of the mean rating and the top box score. As with line 56 in FIG. 5, in FIG. 7 a line 62 illustrates both differentiation and a predictable descending trend in composite importance scores.

Satisfaction scores may also be determined using the same types of calculations as the importance scores. That is, the satisfaction score may be the mean rating, the top box score, or a composite score calculated based on both mean rating and top box score. For example, as with importance scores, the satisfaction score may be calculated by adding or multiplying the mean rating and the top box score for each respective desired outcome.

The opportunity score may be determined/calculated based on the importance score and the satisfaction score. For example, the following equation may be used to calculate opportunity score.

Opportunity Score=Importance Score+MAX(Importance Score−Satisfaction Score, 0)

Using the equation above, the opportunity score equals the importance score plus the greater of the importance score minus the satisfaction score and zero. This means that if the satisfaction score is higher than the importance score, then the value of importance score minus satisfaction score will be negative, and zero will be added to the importance score to get the opportunity score. Thus, using this equation, the opportunity score will be no higher than the importance score if the satisfaction score is higher than the importance score.

Figure 8:
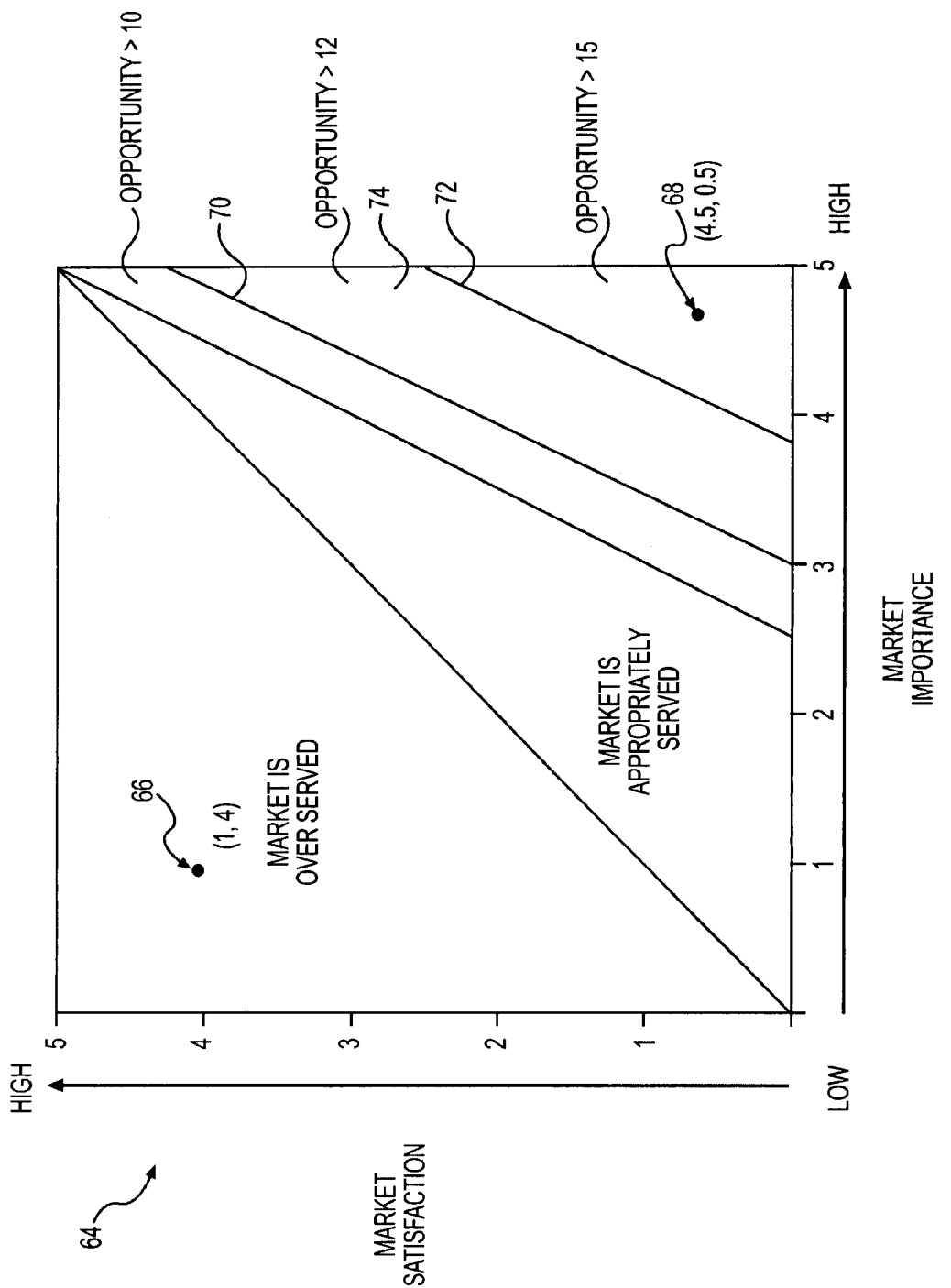
FIG. 8 is a graph illustrating the relationship between satisfaction score, importance score, and opportunity score.

FIG. 8 shows a graph 64, which illustrates the correlation between market satisfaction, market importance, and opportunity score. Low opportunity scores fall in the top left of the chart. Opportunity scores increase toward the bottom and right of the chart, with the highest opportunity scores at the very bottom right, where market importance is highest and market satisfaction is lowest.

Thus, when the market survey data reveals that a particular desired outcome is very important to customers (i.e., high "market importance") and that current products are not satisfying the desire for that outcome (i.e., low "market satisfaction"), the opportunity score is high. A high opportunity score indicates an opportunity to fill an unmet but highly desired outcome in the market.

Although the axes of graph 64 are labeled with a scale of 1-5, these graduations are intended to be exemplary only. In alternative embodiments, the scales may be somewhat different (e.g., 1-10 instead of 1-5) or generally qualitative (e.g., "low-high," as also shown in FIG. 7) instead of quantitative. In some embodiments, the scale for each axis may correspond to a grading scale that customers may use to complete the customer survey administered to collect the data. For example, customers may be asked to rate, using a scale of 1-5, how important a particular outcome is to them and also asked to use the same scale to rate their present level of satisfaction with current products on the market with respect to that outcome. The survey results may be averaged to determine the mean market importance rating and the mean market satisfaction rating to be plotted on graph 64. For example, for a given outcome, survey data may reveal a mean market importance rating of "1" and a mean market satisfaction rating of "4." For such an outcome, the results may be plotted on graph 64, at point 66 near the top left of graph 64. An outcome determined to have an average market importance of "4.5" and a market satisfaction of "0.5" would be plotted at point 68 near the bottom right of graph 64. The diagonally oriented bands indicate similar opportunity scores. For example, all points that fall on line 70 have the same opportunity score, in this case a score of 12. All points that fall on line 72 have the same opportunity score of 15. Therefore, all points that fall within area 74 have an opportunity score between 12 and 15.

Exemplary methods of determining the desirability of potential features (step 30 in FIG. 2) will now be discussed. Desirability of potential features may be determined using any suitable method. In one exemplary embodiment, the Kano Model or aspects thereof may be used to analyze desirability. Application of the Kano Model to the disclosed market analysis may include classifying potential features based on the responses of survey participants (a.k.a., respondents) to the positive and negative questions regarding each potential feature. FIG. 9 is a chart 76 illustrating one exemplary scheme for classifying desirability data. The features may be classified by finding the intersection of the two responses on the grid of chart 76. For example, if a survey participant responds that they would feel neutral if the product did not have a given feature, but that they would like it if the product did have the feature, this pair of answers would fall in square 78 on the grid. This pair of responses would be classified as "A" for Attractive to customers. Exemplary classification letters are defined in a legend 80.

Features for which respondents felt that it would be normal (or expected) if the product did not include the feature, but indicated that they would like it if the product did include the feature, would also be classified as "A." A classification of "M" (for Must be or Must have) indicates that respondents would feel either neutral or normal if the product included the feature and would dislike it if the feature were omitted. A classification of "R" (for Reverse, as in reverse delighter or reverse normal) indicates that respondents would like it if the product did not have the feature or that they would dislike it if the product did have the feature. Features for which respondents indicated that they would dislike it if the feature was omitted and would like it if the feature was included, may be classified as "O" for One-Dimensional (because satisfaction is directly related to whether the product includes the feature or not).

Responses that indicate a respondent would like it either way if the feature was included or excluded, and responses where a respondent indicated they would dislike it either way, whether the feature were included or excluded, may be classified as "Q" for Questionable, because, in both cases, the pair of responses contradict one another, and generally do not make sense. Responses classified as "Q" for Questionable may, in some embodiments, be ignored during analysis of survey results. Features for which respondents indicated they would feel normal or neutral if the feature were excluded and normal or neutral if the feature were included may be classified as "I" for Indifferent, because respondents appear to be indifferent about whether the product includes the feature or not.

Results may be tabulated as shown in FIG. 10. The results may be shown as the number of respondents classifying the feature in each category, and/or the percentage of respondents classifying the feature in each category. In some situations, percentages may be advantageous to use, such as, for example, when the total number of survey participants is not a round number like 100 or 1000.

Interpretation of these results may vary depending on the distribution of the classifications. For example, if an overwhelming majority of responses fall in the "A" category, then it is clear that this feature is attractive to most respondents. However, in many cases, the responses fall more evenly into the various categories. In such cases, a calculation may be performed and/or other statistical analysis of the data may be performed. Exemplary equations that may be used are described below.

A satisfaction coefficient may be calculated to determine the level of positive response for a potential feature. The satisfaction coefficient may be calculated for each feature using the following equation:

$$\text{Satisfaction Coefficient} = (A+O)/(A+O+M+I)$$

In the equation above, the letters A, O, M, and I represent the number of responses that fell in each of the respective categories named with the same letter (see legend 80 in FIGS. 9 and 10). A dissatisfaction coefficient may be calculated for each feature using the following equation:

$$\text{Dissatisfaction Coefficient} = (O+M)/(A+O+M+I)*(-1)$$

A desirability-coefficient may be calculated based on the satisfaction coefficient and the dissatisfaction coefficient using any suitable mathematical formula. One exemplary calculation may involve simply subtracting the dissatisfaction coefficient from the satisfaction coefficient as follows.

$$\text{Desirability Coefficient} = (\text{Satisfaction Coefficient}) - (\text{Dissatisfaction Coefficient})$$

For any of the calculations disclosed herein, variations of the exemplary equations discussed may be used to achieve similar results. Any equations using the same or similar factors may be used as long as the calculations are performed consistently for each desired outcome and each potential feature. In addition to using addition or subtraction (e.g., for calculating opportunity score), certain factors may be weighted more heavily than others. For example, if the importance of a certain set of outcomes were more significant than the present satisfaction, differing weighting factors could be incorporated into the equation for opportunity score. For example, the importance scores could be multiplied by 3 and the satisfaction component of the equation could be multiplied by 2. The resulting equation could be as follows:

Opportunity Score=((3)*Importance Score)+((2)*(MAX(Importance Score−Satisfaction Score, 0))

Different weighting may also be applied to mean ratings and top box scores, as well as satisfaction coefficients and dissatisfaction coefficients and any of the values used to determine these scores and/or coefficients. For example, the equation above for desirability coefficient weights the "O" category more heavily than the others (by a factor of 2). The O category indicates the most positive of the feedback from respondents, so some additional weighting of the O's may be desired. This can be modified to provide any desired weighting, however. For example, the O's could be weighted more than the A's and M's by a factor of 3/2. The resulting equation could be:

$$\text{Desirability Coefficient} = \frac{(3)(O) + (2)(A) - (2)(M)}{(A + O + M + 1)}$$

Figure 11:
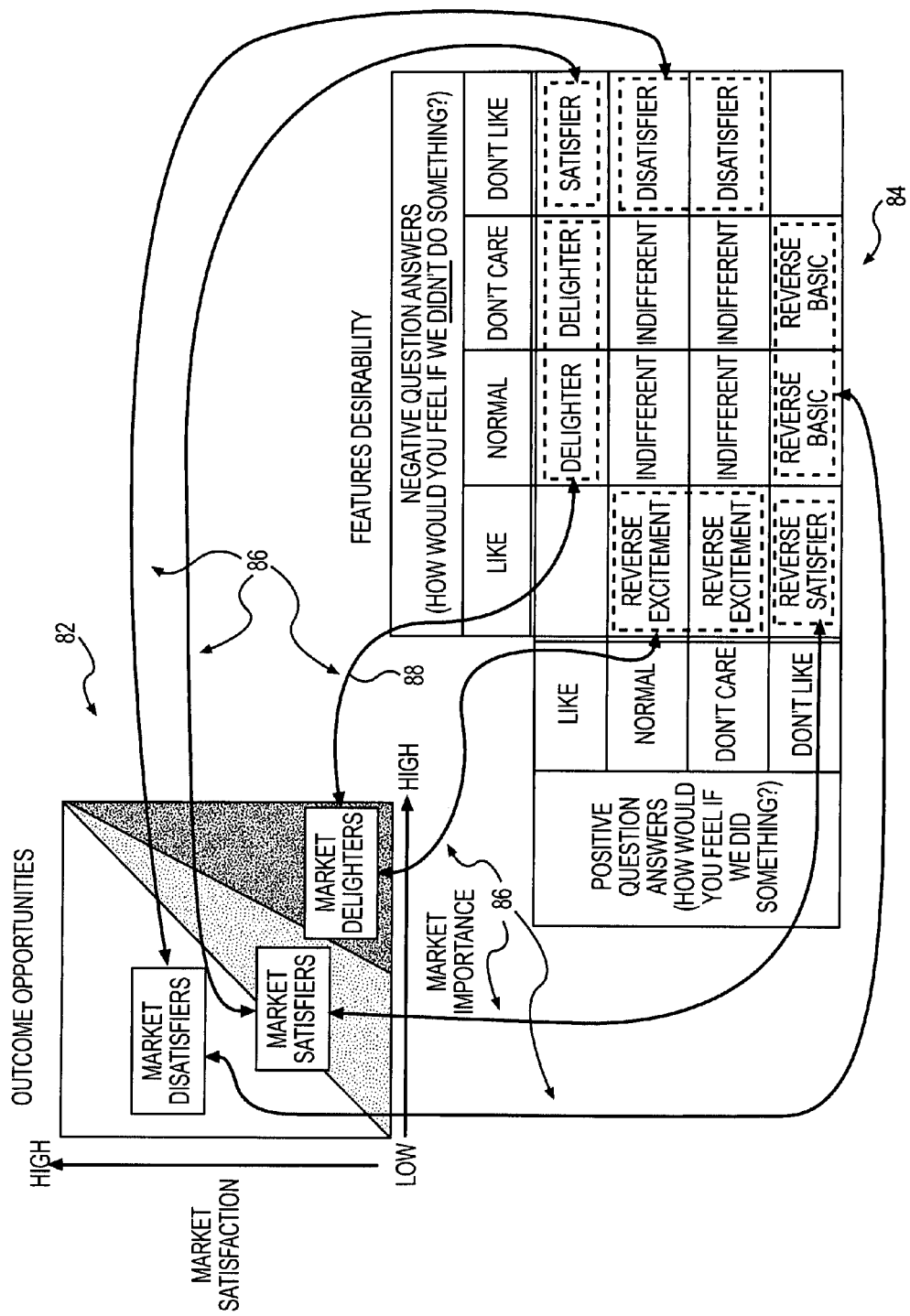
FIG. 11 is a diagrammatic representation of a graphic illustrating correlation between the data in the chart of FIG. 8 and the chart of FIG. 9.

FIG. 11 is a graphical illustration of correlations between the data in FIG. 8 and the data in FIG. 9. An upper portion 82 of FIG. 11 corresponds to the data in FIG. 8. A bottom portion 84 of FIG. 11 corresponds to the data in FIG. 9.

As illustrated in the bottom portion 84 of FIG. 11, the value of the desirability coefficient indicates whether a product feature falls into one of a number of categories. For example, a product feature may be classified as a "Satisfier" when customers exhibit a strong desire for the feature to be included and indicate negative sentiment about the possibility of the feature being excluded. A product feature may be classified as a "Dissatisfier" when customers would be particularly dissatisfied with the product if the feature were included on the product. A product feature may be classified as a "Delighter" when customer feedback indicates that the feature would be nice to have, but that the customers would not be particularly unhappy if the feature were excluded. A product feature may be classified as a "Reverse Exciter" when customers would prefer the feature to be excluded, but would not care if the feature were included. A product feature may be classified as "Indifferent" when customers do not seem to care whether the feature is included or not.

The disclosed method may include performing an analysis to correlate the opportunity score for desired outcomes with the desirability coefficients for the various potential solutions/features. (Step 32 in FIG. 2.) Arrows 86 drawn between aspects of upper portion 82 of FIG. 11 and aspects of bottom portion 84 of FIG. 11 illustrate some general correlations between desired outcomes and potential features having similar priority rankings. For exammple, arrow 88, indicates a correlation between potential features classified as delighters in bottom portion 84 and outcomes classified as market delighters in upper portion 82. Arrow 88 indicates the correlation between the relative high priority that manufacturers would likely give to outcomes with a high opportunity score and the high priority that manufacturers would give potential features with a high desirability coefficient. A more detailed method of correlating desired outcomes with potential features is discussed below with regard to FIG. 12.

In making the correlations the potential solutions/features considered may be "on the shelf," in development, or in concept phase. The goal of the analysis may be to determine which of these features have been highly rated in terms of desirability coefficient and correspond to desired outcomes which received a high opportunity score. By determining where a correlation exists between desired outcomes and potential solutions, the manufacturer can then consider this information when determining which features would be worthwhile to include in the product.

In some cases, the correlations may be determined manually by reconvening a meeting of the individuals who were involved in the initial workshop. The employees who are involved in the meeting may be familiar with the market and thus in a position to determine, from their collective experience and intuition, which outcomes correlate to specific product features. For example, these individuals are likely to know, from their personal experiences and intuition, that the desired outcome of fuel economy correlates to the potential feature of a hybrid (gas-electric) drive.

The process used to make these correlations for specific outcomes and specific features may involve, for example, manual use of a two column chart, an example of which is depicted in FIG. 12. In one column (90), all of the desired outcomes may be listed in descending order by opportunity score. In a second column (92), the potential features (solutions) may be listed in descending order by desirability coefficient. When intuition and/or experience leads the meeting participants to agree that a feature in the second column correlates to an outcome in the first column, the meeting participants may draw a line linking the two, as shown in FIG. 12. The relative positions of the lines are then analyzed. The extent to which a desired outcome in the upper part of the first column correlates to a feature in the upper part of the second column (i.e., customers highly rank both the desired outcome and a feature that leads to that outcome.) tends to indicate the priority that should be given to each feature. That is, the higher up on the chart a double headed arrow is drawn, the higher the priority that should be given to the potential feature associated with that arrow. This priority may be determined using an algorithm. For example, the desirability coefficient ranking of each feature may be added to the opportunity score ranking to determine a priority score. The feature associated with the lowest priority score should be given the highest priority for incorporation into a new product.

In some cases, the correlations between outcomes and potential features may be preliminarily established, e.g., at the initial workshop. Whether the correlations are preliminarily established or determined at a later time, such as after the survey results have been compiled, a computer processor may be used to rank the outcomes by importance and to rank the potential features by desirability coefficient. The processor may also be used to calculate the priority of potential features, e.g., using an algorithm as discussed above with regard to performing such calculations manually.

Industrial Applicability

The presently disclosed method may be utilized to determine which possible solutions or features will have the most positive effect on sales of a product (or service). The disclosed method considers which outcomes (e.g., product attributes or capabilities) are most important to customers, the degree to which customers are presently satisfied with the ability of current products to achieve those outcomes, and the customers' feedback with respect to various potential features which could improve a product's ability to achieve particular outcomes.

By considering customer feedback regarding potential solutions or features, manufacturers and/or other interested parties may obtain information about what features will likely sell well. The final decision about which features to implement on a product will take into consideration other factors as well, however, such as the costs of development and production for given features.

Therefore, while the disclosed method can give a manufacturer an idea of which features would generate the most revenue, other factors, such as development and production costs, must be considered to predict profits. For example, a potential feature that is indicated to have the highest desirability coefficient and provide a solution for an outcome having the highest opportunity score, may actually be cost prohibitive to implement on a particular product.

It may still be advantageous, though, to have the knowledge of the desirability and opportunity associated with a potential feature, even if implementation of the potential feature would be cost prohibitive. For example, the knowledge about desirability and opportunity may facilitate the cost benefit analysis in the first place. In addition, even if the manufacturer chooses not to implement a particular feature due to development and/or production costs, the manufacturer would be able to recognize the relative potential for success if a competitor were to implement such a feature. In this situation, the manufacturer would be able to readily recognize a business threat if, for example, a competitor found a more cost effective way to implement a given feature.

Although embodiments of the invention have been described, it will be apparent to those skilled in the art that various modifications and variations can be made in the disclosed method for performing a market analysis without departing from the scope of the disclosure. In addition, other embodiments of the disclosed apparatus and method will be apparent to those skilled in the art from consideration of the specification. It is intended that the specification and examples be considered as exemplary only, with a true scope of the disclosure being indicated by the following claims and their equivalents.

What is claimed is:

1. A method for performing a market analysis, comprising:
    collecting survey data from survey participants, the survey data including:
        evaluation data for desired outcomes, the desired outcomes consisting of attributes of one or more products or services, wherein the desired outcome evaluation data includes:
            importance data indicative of the level of importance survey participants respectively attribute to the individual desired outcomes; and
            satisfaction data indicative of the present level of satisfaction survey participants have with the ability of current products or services to achieve the individual desired outcomes; and
        evaluation data for potential features that could be implemented to provide the desired outcomes, wherein the potential features evaluation data includes:
            inclusion data indicative of how survey participants would feel if the individual potential features were included in a product;
            exclusion data indicative of how survey participants would feel if the individual potential features were excluded from a product; and
            desirability data based on the inclusion data and the exclusion data, the desirability data being indicative of the affinity survey participants have for the individual potential features;
    processing the collected survey data using a computer processor, including:
        calculating, based on the importance data and the satisfaction data, opportunity scores for the individual desired outcomes, wherein the opportunity scores are indicative of the extent to which the desired outcomes are valued by the survey participants and presently unmet by current products or services; and
        correlating potential features with desired outcomes that the potential features could provide; and
        ranking the potential features based on the collected desirability data for the individual potential features and the calculated opportunity score for the individual desired outcomes.

2. The method of claim 1, further including using the processor to perform, for each potential feature, the following:
    calculating a satisfaction coefficient indicative of the inclusion data for the respective potential feature;
    calculating a dissatisfaction coefficient indicative of the exclusion data for the respective potential feature; and
    calculating a desirability coefficient based on the satisfaction coefficient and dissatisfaction coefficient.

3. The method of claim 2, wherein, for each potential feature, the satisfaction coefficient is indicative of the number of survey participants that rated the respective potential feature as attractive or one-dimensional;
    wherein a rating of attractive means that the survey participant would like it if the respective potential feature were included on a product and would feel indifferent or feel that it would be expected if the potential feature were not included on the product; and
    wherein a rating of one-dimensional means that the survey participant would like it if the respective potential feature were included on the product and would dislike it if the potential feature were omitted from the product.

4. The method of claim 2, wherein the dissatisfaction coefficient is indicative of the number of survey participants that rated the respective potential feature as one-dimensional or expected;
    wherein a rating of one-dimensional means that the survey participant would like it if a potential feature were included on the product and would dislike it if the potential feature were omitted from the product; and
    wherein a rating of expected means that the survey participants expect that the product would normally include the potential feature.

5. The method of claim 2, wherein calculating the desirability coefficient includes subtracting the dissatisfaction coefficient from the satisfaction coefficient.

6. The method of claim 2, wherein calculating desirability coefficients involves weighting some responses of survey participants differently from others.

7. The method of claim 2, wherein ranking the potential features based on the collected desirability data and the calculated opportunity scores includes determining a desirability ranking for each of the potential features according to the calculated desirability coefficients and determining an opportunity ranking for each of the desired outcomes according to the calculated opportunity scores.

8. The method of claim 1, wherein, for each desired outcome, calculating opportunity scores includes calculating an importance score, which includes:

determining a top box score representative of the number of survey participants that rated the importance of the desired outcome with at least a predetermined rating;

calculating an average importance rating for the desired outcome; and calculating a composite importance score by multiplying the top box score by the average importance rating.

9. The method of claim 1, wherein, for each desired outcome, calculating opportunity scores includes calculating an importance score, which includes:

determining a top box score representative of the number of survey participants that rated the importance of the desired outcome with at least a predetermined minimum rating;

calculating an average importance rating for the desired outcome; and calculating a composite importance score by adding the top box score and the average importance rating.

10. A system for performing a market analysis, comprising:

a processor configured to:
  collect survey data from survey participants, the survey data including:
    evaluation data for desired outcomes, the desired outcomes consisting of attributes of one or more products or services, wherein the desired outcome evaluation data includes:
      importance data indicative of the level of importance survey participants respectively attribute to the individual desired outcomes; and
      satisfaction data indicative of the present level of satisfaction survey participants have with the ability of current products or services to achieve the individual desired outcomes; and
    evaluation data for potential features that could be implemented to provide the desired outcomes, wherein the potential features evaluation data includes:
      inclusion data indicative of how survey participants would feel if the individual potential features were included in a product; and
      exclusion data indicative of how survey participants would feel if the individual potential features were excluded from a product; and
      desirability data based on the inclusion data and the exclusion data, the desirability data being indicative of the affinity of survey participants for the individual potential features; and
  process the collected survey data, by:
    calculating, based on the importance data and the satisfaction data, opportunity scores for the individual desired outcomes, wherein the opportunity scores are indicative of the extent to which the desired outcomes are valued by the survey participants and presently unmet by current products or services; and
    ranking the potential features based on the collected desirability data for the individual potential features and the calculated opportunity score for the individual desired outcomes.

11. The system of claim 10, wherein, for each individual potential feature, the processor is further configured to:

calculate a satisfaction coefficient indicative of the inclusion data for the individual potential feature;

calculate a dissatisfaction coefficient indicative of the exclusion data for the individual potential feature; and calculate a desirability coefficient based on the satisfaction coefficient and dissatisfaction coefficient for each respective potential feature.

12. The system of claim 11, wherein, for each potential feature, the satisfaction coefficient is indicative of the number of survey participants that rated the respective potential feature as attractive or one-dimensional;

wherein a rating of attractive means that a survey participant would like it if the respective potential feature were included on the product and would feel indifferent or feel that it was normal if the respective potential feature were not included on the product; and wherein a rating of one-dimensional means that a survey participant would like it if the respective potential feature were included on the product and would dislike it if the respective potential feature were omitted from the product.

13. The system of claim 11, wherein, for each potential feature, the dissatisfaction coefficient is indicative of the number of survey participants that rated the respective potential feature as one-dimensional or expected;

wherein a rating of one-dimensional means that a survey participant would like it if the respective potential feature were included on the product and would dislike it if the respective potential feature were omitted from the product; and wherein a rating of expected means that a survey participant expects that the product would normally include the respective potential feature.

14. The system of claim 11, wherein, for each potential feature, the desirability coefficient is calculated by subtracting the dissatisfaction coefficient from the satisfaction coefficient.

15. The system of claim 11, wherein, for each potential feature, the calculation used to calculate desirability coefficient weighs some responses of survey participants differently from others.

16. The system of claim 11, wherein the processor is configured to rank the potential features based on the collected desirability data and the calculated opportunity scores by determining a desirability ranking for each of the potential features according to the calculated desirability coefficients and determining an opportunity ranking for each of the desired outcomes according to the calculated opportunity scores.

17. The system of claim 10, wherein, for each desired outcome, calculating opportunity scores includes calculating an importance score, which includes:

determining a top box score representative of the number of survey participants that rated the importance of the respective desired outcome with at least a predetermined rating;

calculating an average importance rating for the respective desired outcome; and calculating a composite score for the respective desired outcome by multiplying the top box score by the average importance rating.

18. The system of claim 10, wherein, for each desired outcome, calculating opportunity scores includes calculating an importance score, which includes:

determining a top box score representative of the number of survey participants that rated the importance of the respective desired outcome with at least a predetermined minimum rating;

calculating an average importance rating for the respective desired outcome; and calculating a composite score for the respective desired outcome by adding the top box score and the average importance rating.

19. A method for performing a market analysis, comprising:
- collecting survey data from survey participants, the survey data including:
  - evaluation data for desired outcomes, the desired outcomes consisting of attributes of one or more products or services, wherein the desired outcome evaluation data includes:
    - importance data indicative of the level of importance survey participants respectively attribute to the individual desired outcomes; and
    - satisfaction data indicative of the present level of satisfaction survey participants have with the ability of current products or services to achieve the individual desired outcomes; and
  - evaluation data for potential features that could be implemented to provide the desired outcomes, wherein the potential features evaluation data includes:
    - desirability data indicative of the affinity survey participants have for the individual potential features;
- processing the collected survey data using a computer processor, including:
  - calculating, based on the importance data and the satisfaction data, opportunity scores for the individual desired outcomes, wherein the opportunity scores are indicative of the extent to which the desired outcomes are valued by the survey participants and presently unmet by current products or services, wherein calculating an opportunity score includes calculating an importance score as a function of the number of survey participants that rated the importance of the desired outcome with at least a predetermined rating and an average value of importance assigned to the desired outcome by the survey participants; and
  - correlating potential features with desired outcomes that the potential features could provide; and
- ranking the potential features based on the collected desirability data for the individual potential features and the calculated opportunity score for the individual desired outcomes.

* * * * *